United States Patent [19]

Hart, deceased et al.

[11] Patent Number: 4,731,947
[45] Date of Patent: Mar. 22, 1988

[54] APPARATUS FOR HOLDING A FISHING ROD

[76] Inventors: Charles W. Hart, deceased, late of Nevada County, Calif.; by Margaret B. Hart, executor, 10300 Glenbrook Dr./P.O. Box 735, Grass Valley, Calif. 95945; Harry Stewart, 220 Nihell St., Nevada City, Calif. 95959

[21] Appl. No.: 807,545

[22] Filed: Dec. 11, 1985

Related U.S. Application Data

[63] Continuation-in-part of Ser. No. 509,959, Jun. 30, 1983, abandoned.

[51] Int. Cl.$^4$ .............................................. A01K 97/10
[52] U.S. Cl. ...................................... 43/21.2; 248/514
[58] Field of Search ........................... 43/21.2, 15, 17; 248/514, 538, 539, 900, 145

[56] References Cited

U.S. PATENT DOCUMENTS

| | | | |
|---|---|---|---|
| 2,502,272 | 3/1950 | Patton | 248/514 |
| 2,530,265 | 11/1950 | Phalen | 248/514 |
| 2,566,496 | 9/1951 | Montano | 248/514 |
| 2,917,258 | 12/1959 | Furey | 43/21.2 |
| 3,154,274 | 10/1964 | Hillcourt | 43/21.2 |
| 3,246,865 | 4/1966 | Latimer | 43/21.2 |
| 3,601,919 | 8/1971 | Nixon | 43/21.2 |
| 3,881,269 | 5/1975 | Timmons | 43/15 |
| 3,897,646 | 8/1975 | Sheets | 43/15 |

*Primary Examiner*—Gene P. Crosby
*Attorney, Agent, or Firm*—Flehr, Hohbach, Test, Albritton & Herbert

[57] ABSTRACT

An apparatus for holding a fishing rod. The apparatus comprises a body member having a top surface for supporting the rod thereon, at least one shoulder member formed at one end of the body member to define a first channel, and a clasp member mountable to said body member at an opposite end to define a second channel. The first channel has an open side substantially parallel to the body member's top surface, and the second channel has an open side substantially perpendicular to the top surface. The second channel is configured to resist certain forces imposed on the rod tip. The rod is placed in the rod holder to extend between the first and second channels with the butt of the rod extending beyond the second channel. The body member may be pivotally mounted at one end thereof, with an arm mounted at this one end. Means may be connected between the arm and a point spaced from the pivotally mounted end of the body member for dampening movement of the body member. The apparatus prevents damage to the line and/or rod due to a sudden impact to the line, such as might occur when a fish strikes the lure or bait. The apparatus is also designed to facilitate removal of the rod therefrom.

37 Claims, 20 Drawing Figures

APPARATUS FOR HOLDING A FISHING ROD

This application is a continuation-in-part of application Ser. No. 509,959, filed June 30, 1983 now abandoned.

The present invention relates generally to fishing rod holders, and more particularly to a fishing rod holder designed primarily for trolling, which has the ability to comply with (rotate), provide measured resistance to (absorb) and dampen (by the resistance of the water) movement of the rod, and which allows quick and easy removal of the rod.

A significant portion of all fishing is done from small boats. There are times when the fisherman desires to have the free use of his hands to run the boat, operate the motor, or do any number of other things that fisherman are likely to do. At such times, the fisherman often resorts to the use of a fishing rod holder.

Fishing rod holders used heretofore have certain drawbacks. Rodholders currently in use are designed for stationary use or use from a fixed location and are not well adapted for use while trolling, i.e., while moving through the water. Of the existing rod holders which can be used for trolling, one such drawback is that they rigidly mount the rod and do not allow for the sudden movement of the rod, notwithstanding the ability of rods to flex and the use of drag releases on reels. Thus, the sudden impact of a fish striking the lure or bait can result in breakage of the line and/or rod. This sudden impact can also cause the hook to tear in the fish's flesh and later come loose.

Another drawback with rod holders used heretofore for trolling is that they have a closed end portion in which the rod handle is positioned, making it very difficult to remove the rod from the holder when forces, such as those due to trolling, are exerted on the rod.

The typical fishing rod is from seven to ten feet in length. The reel is usually mounted approximately twelve to twenty inches from the butt of the rod and there is usually another four to eight inches of rod handle ahead of the reel. For the typical closed-end rod holder, this can mean that a twelve to twenty inch portion of the handle must be fed out through the closed end portion of the holder, while the fisherman at the same time wrestles with the pole, the fish and the line. When trolling, the difficulty of removing a rod from a closed-end holder is exacerbated. The force components acting on the fishing rod during trolling are aft (the major force) and down (the minor force). These forces are created by the drag of the line and lure, and by the resistance of the fish if hooked. When these forces are acting on the rod, it is more difficult to remove a rod from existing rod holders.

The present invention is designed to eliminate the above-described problems, and accordingly, an object of the present invention is to provide a rod holder which permits quick and easy removal of the rod therefrom.

Another object of the present invention is to provide a rod holder wherein the rod supporting portion is adapted to rotate in response to a pull on the line to facilitate removal of the rod from the holder.

Yet another object of the present invention is to provide a rod holder which is capable of complying with, providing measured resistance to and dampening movement of the rod to reduce line and/or rod breakage.

Still another object of the present invention is to provide a rod holder which maintains tension on the line.

The fishing rod holder of the present invention includes a body member having a top surface adapted to support a rod thereon, a first channel formed at one end of said body member, and a second channel formed at an opposite end. The first channel has one side open and substantially parallel to the top surface of the body member. The second channel has an open side perpendicular to the top surface. The second channel is configured to resist rearward and downward forces imposed on the tip of the rod. The rod is positioned in the rod holder so that it extends between the first and second channels with the butt thereof projecting outwardly from the second channel. The top surface of the body member provides a fulcrum for levering the rod free from the rod holder. The body member may be pivotally mounted at one end thereof with an arm mounted at this one end. Dampening means, such as a helical spring, are connectable between the arm and a point spaced from the pivotally mounted end of the body member. The dampening means resists pivotal movement of the body member. It complies with, provides measured resistance to and dampens movement of the rod, the dampening means may be a spring means. Means may also be provided for rigidly mounting the fishing rod holder to an appropriate support structure, such as the gunwale of a boat.

The fishing rod holder of the present invention is described hereinafter in more detail in conjunction with the drawings wherein.

The fishing rod holder of the present invention may be utilized either for trolling or for fishing from a fixed location. However, it is designed principally for trolling as opposed to other rod holders used heretofore designed primarily for use from a fixed location and which were sometimes used for trolling. The conditions which exist during trolling that are integral to the function of the rod holder of the present invention are the movement of the boat through the water, the drag of the line and lure or the resistance of a hooked fish, and the resultant forces exerted, that is, the pull on the line which exerts a force on the rod. The rod holder utilizes these forces to hold the rod securely while trolling and to help pull the rod free when so desired by the fisherman.

When trolling, there is a drag or force exerted by the resistance of the water to the passage of the line, lure or bait. This force is exerted in an aft direction from the rod tip and downward from the rod tip to the surface of the water where the line enters the water. Both the aft and downward forces components are important to the function of the rod holder of the present invention.

When trolling, it is usual and customary to use a weighted or leaded line to control the depth at which the lure or bait travels through the water. The more line out the deeper the lure or bait. This length can be anywhere from several feet to several hundred feet. This entails the use of a typical trolling reel. Occasionally, a fisherman will use unweighted line that runs near the surface. This usually entails the use of a spinning reel. In either case, the resistance of the water acts as a fulcrum or pivot through which the forces on the line are directed from the surface of the water to the tip of the rod. The forces thus acting on the tip of the rod when trolling are aft (the major force) and down (the minor force).

Referring now to the drawings, in which like components are designated by like reference numerals throughout the various figures, attention is first directed to FIGS. 1-5. FIGS. 1-5 show an apparatus 10 for holding a fishing rod 12. Apparatus 10 is mounted on the port side of a boat 46. The boat is moving in the direction of arrow "A", and line 12a from reel 16 is trailing behind stern 46a of the boat.

Figures 1, 2:
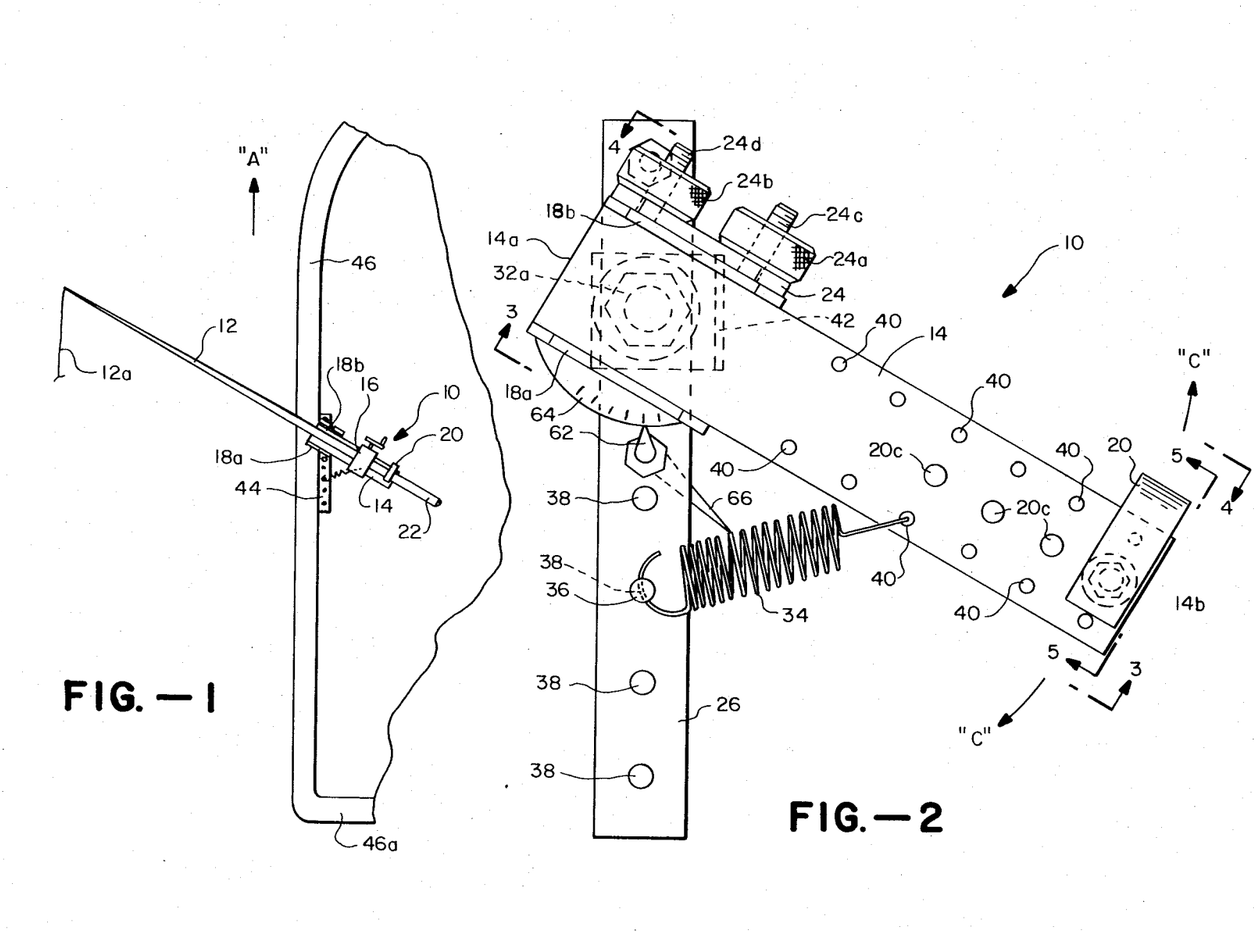
FIG. 1 is a schematic view showing the rod holder of the present invention in use on a boat.
FIG. 2 is a schematic view illustrating the rod holder of the present invention in more detail wherein the rod holder is mounted on the port side of a boat.
Figure 3:
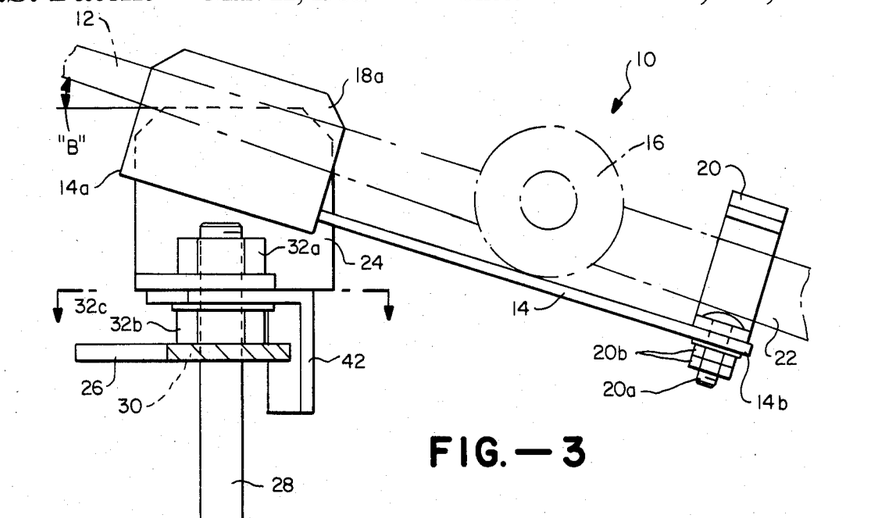
FIG. 3 is a view along line 3—3 of FIG. 2 and showing a rod and reel positioned in the rod holder.

Apparatus 10 includes a body member 14 adapted to support rod 12 thereon. As best illustrated in FIGS. 2 and 3, the fishing rod is supported on the top surface of body member 14 with reel 16 resting inboard of a cradle or shoulder members 18a and 18b. Shoulder members 18a and 18b form a substantially U-shaped channel at an end 14a of body member 14. The high sides of the cradle prevent the rod and reel from being accidentally pulled from rod holder 10. The open side of the channel is substantially parallel to the top surface of body member 14.

Rod holder 10 further includes a clasp 20 rotatably secured at an end 14b of body member 14. Clasp 20 is secured to body member 14 by means of bolt 20a which is positioned within an opening 20c formed in body member 14 (See FIG. 5). Nuts 20b secure the bolt within opening 20c. Body member 14 includes a number of openings 20c (See FIG. 2) so that the position of the clasp along the body member may be varied.

Figures 4, 5:
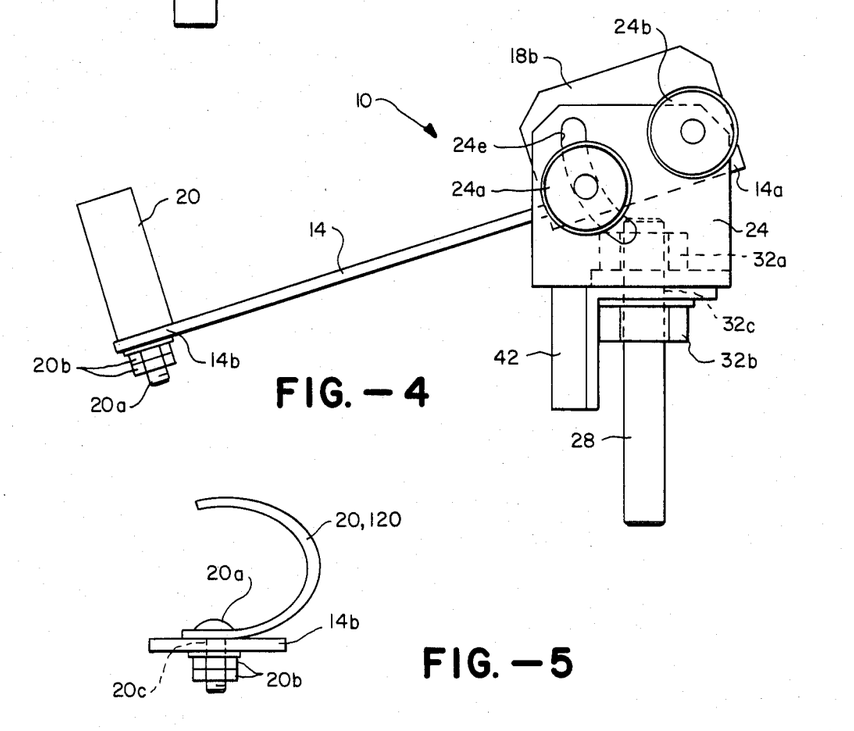
FIG. 4 is a view along line 4—4 of FIG. 2 with the tension arm of the rod holder not shown.
FIG. 5 is a view along line 5—5 of FIG. 2, with certain details thereof omitted, illustrating the clasp member of the rod holder.
Figure 15:
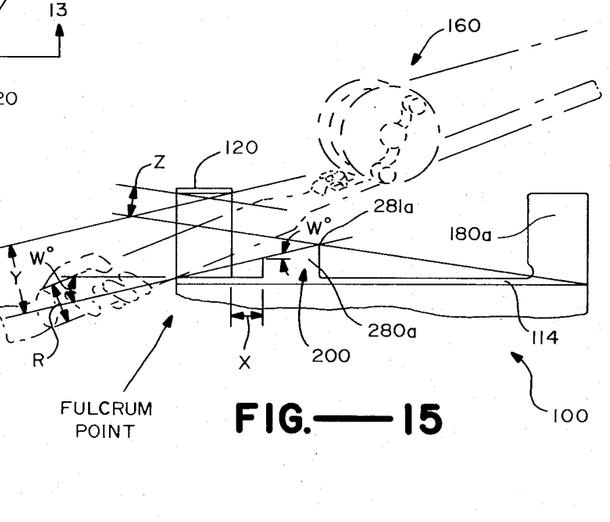
FIG. 15 is schematic view illustrating the method of the retention and extraction of the rod from the rod holder of FIG. 12.

Clasp 20 forms a channel and has an open side which is substantially perpendicular to the top surface of the body member. The bottom of clasp 20 is formed by the top surface of body member 14; thus, the bottom of the clasp is substantially flat. Clasp 20 holds a handle portion 22 of rod 12 to resist any rearward and downward forces acting on the tip of the rod by a pull on line 12a. The clasp has an open and unrestricted side which faces toward the stern of the boat to permit quick and easy extraction of the rod from the holder. The remaining sides of the clasp encircle the rod handle. Any appropriate shape that allows clasp 20 to function in this way may be utilized; for example, the clasp may be C-shaped as shown in FIG. 5, or it may be U-shaped as shown in FIG. 15. Preferably, it has a substantially U-shaped configuration.

The bottom of the clasp, actually the top surface of body member 14, forms a fulcrum or base that permits a rod to be levered free of the rod holder by depressing the inboard end of the rod. When the inboard end of the rod is so depressed, the rod pivots on a fulcrum point (see also FIG. 15), raising itself clear of the front channel and thus the rod holder. The force on the tip of the rod then acts to pull the rod free from the holder.

The rod holder is configured to resist removal of the rod either intentionally or accidentally except when the rod is inclined toward the vertical. Thus, any pull on the line holds the rod in place, unless the rod is inclined toward the vertical. The rod may be inclined toward the vertical by a fisherman, not by a strike, snag, or some incidental force from the action of the boat or water. As discussed, the rod may be inclined from the vertical by depressing the inboard portion of the rod handle.

As noted, the clasp is rotatably mounted to body member 14. Nuts 20a and bolts 20b permit the clasp to be rotated through an angle of 180 degrees. As will be discussed below, this permits rod holder 10 to be used on either the starboard or port side of a boat.

A bracket 24, or other suitable means, is provided for pivotally mounting body member 14 to a tension bar or arm 26. As shown in FIGS. 2 and 4, bracket 24 is provided with knobs 24a and 24b for adjusting the angle from the horizontal of body member 14. Altering the angle from the horizontal of body member 14 adjusts the angle of elevation "B" of rod 12 (See FIG. 3). Knobs 24a and 24b are rotatably secured to threaded members 24c and 24d, respectively. Threaded member 24c is slidably located within a slot 24e. Adjusting the location of member 24c in slot 24e determines the angle of elevation "B".

A pivot pin 28 is secured to the lower end of bracket 24 and is adapted to be received in a hole 30 in arm 26. Nuts 32a and 32b, or other appropriate means, secure pivot pin 28 within opening 32c formed in bracket 24. Nut 32b also provides an appropriate spacer between bracket 24 and arm 26. Pivot pin 28 is rotatably received in opening 30 in arm 26 such that body member 14 may pivot with respect to arm 26, the arm, as discussed below, being rigidly mounted to a suitable support structure.

Connected between arm 26 and body member 14 is a means for dampening movement of body member 14 relative to arm 26. In one embodiment, this means is a helical spring 34 connected between body member 14 and arm 26 at a point spaced from the pivotally mounted end of the body member. The degree of dampening of spring 34 may be selected by the proper combination of certain spring parameters, such as the spring's pitch, length, and wire diameter. Other means, such as a gas-filled shock absorber type of device, could be used to absorb or dampen movement of the body member.

As illustrated in FIG. 2, spring 34 is connected to arm 26 by means of a pin 36 which is received in a hole or opening 38 formed in the arm. The other end of spring means 34 is connected to an appropriate hole or opening 40 formed in body member 14. Arm 26 includes a plurality of openings 38 to receive pin 36, and body member 14 has a plurality of openings 40. The tension of the spring means and thus the degree of dampening may be adjusted by connecting the spring means at different points along arm 26 and body member 14.

The dampening means distributes the force of a fish striking the lure or bait over a greater time and distance. The dampening means also permits the rod to align itself with the force exerted by a strike so that the reel's drag mechanism functions properly. Additionally by allowing the rod to align itself with the force created by a strike, the effort needed to remove the rod from the rod holder is reduced. Further, when the rod is levered free of the rod holder, the dampening means rotates the rod holder clear of the rod.

Apparatus 10 further includes a means, such as limiting member 42 (See FIGS. 3, 4 and 11), for controlling the degree of travel of body member 14. In the embodiment illustrated, limiting member 42 is secured to bracket 24 by nuts 32a and 32b. The pivot pin 28 passes through a slot 42a formed in the limiting member, and the limiting member is adapted to abut arm 26 from one end point of the rotation of body member 14 to the other. The direction of rotation of body member 14 is represented by arrows "C" in FIG. 2. The position of limiting member 42 relative to arm 26 may be varied to adjust the degree of travel of body member 14. Limiting member 42 may also be set to hold the body member in a fixed position. The position of the limiting member vis-a-vis arm 26, as well as the force exerted on body member 14 by spring means 34, determines the arc of rotation (along arrows "C") through which the body member may travel.

Figures 6, 7:
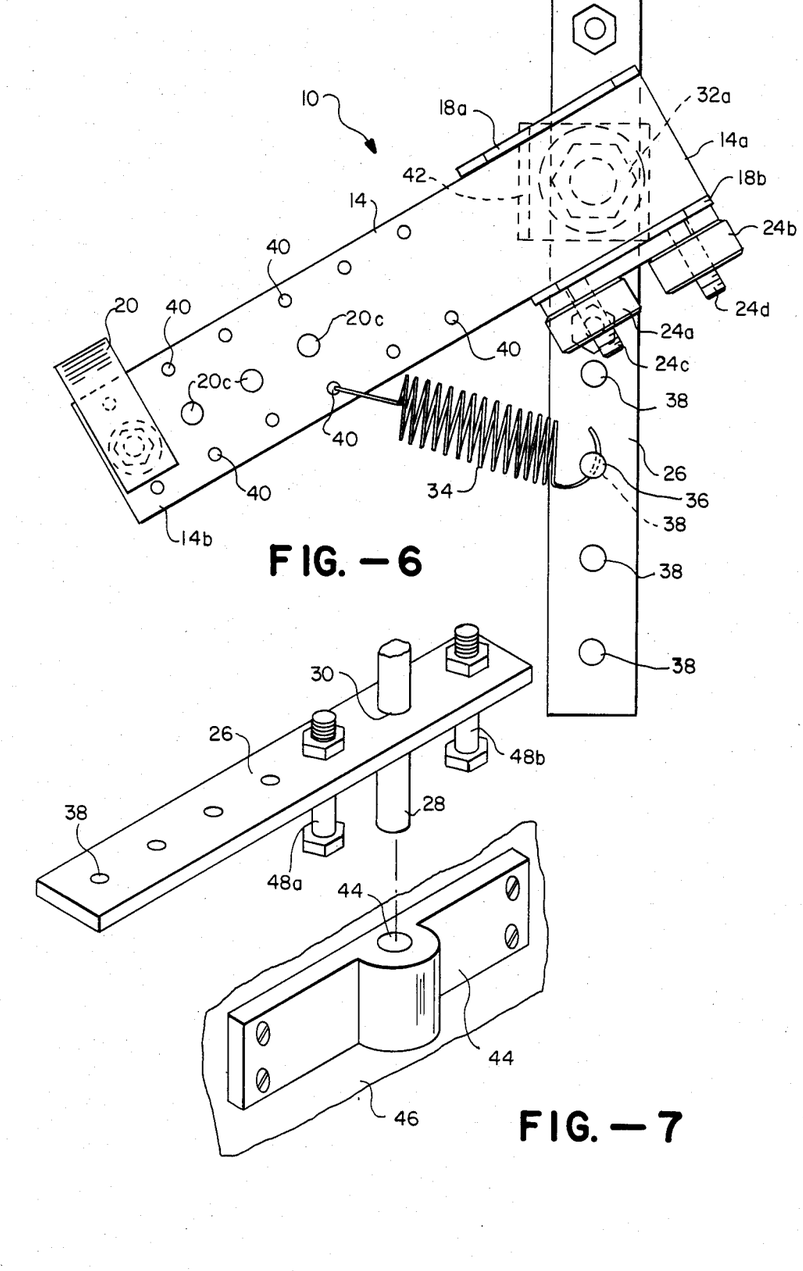
FIG. 6 is a schematic view illustrating the rod holder mounted on the starboard side of a boat.
FIGS. 7-9 show various means for mounting the rod holder.

As shown in FIGS. 1 and 7, apparatus 10 is mounted to a support structure, and in this instance, is mounted to an oarlock base 44 of a typical open fishing-rowing boat 46. Pivot pin 28 of apparatus 10 is positioned in an opening 49 in the oarlock base. Locating pins 48a and 48b are fixedly secured to arm 26 and are adapted to engage the side of boat 46 to fixedly mount apparatus 10 thereto.

Figure 8:
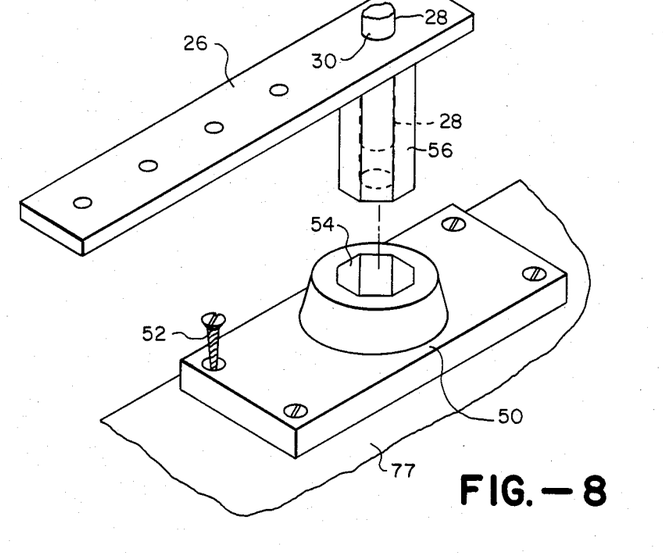
Figure 9:
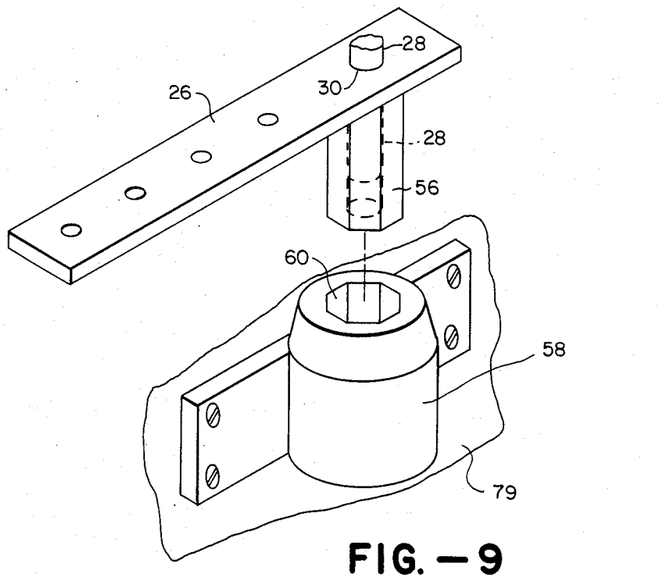
Figure 13:
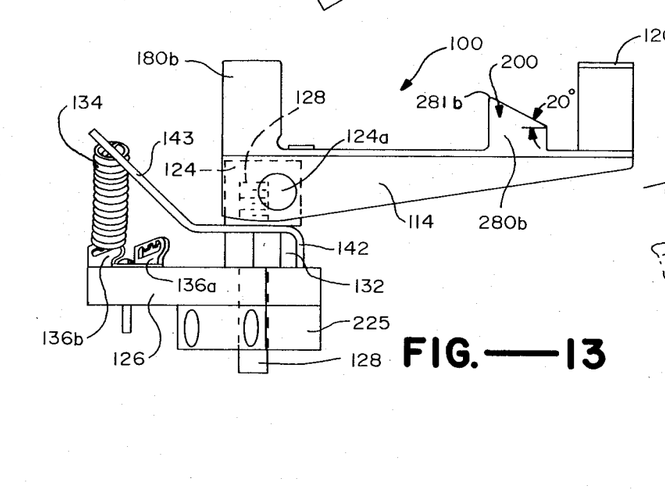
FIG. 13 is a view along line 13—13 of FIG. 12.
Figure 14:
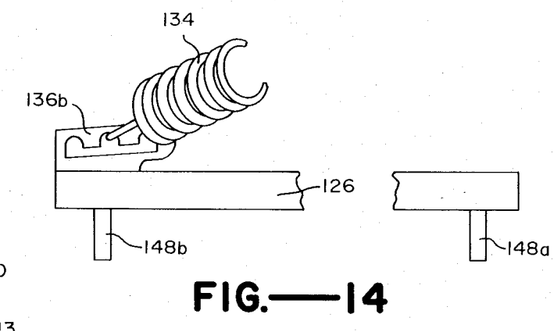
FIG. 14 is a fragmentary schematic view of a portion of the rod holder illustrated in FIG. 12.
Figure 16:
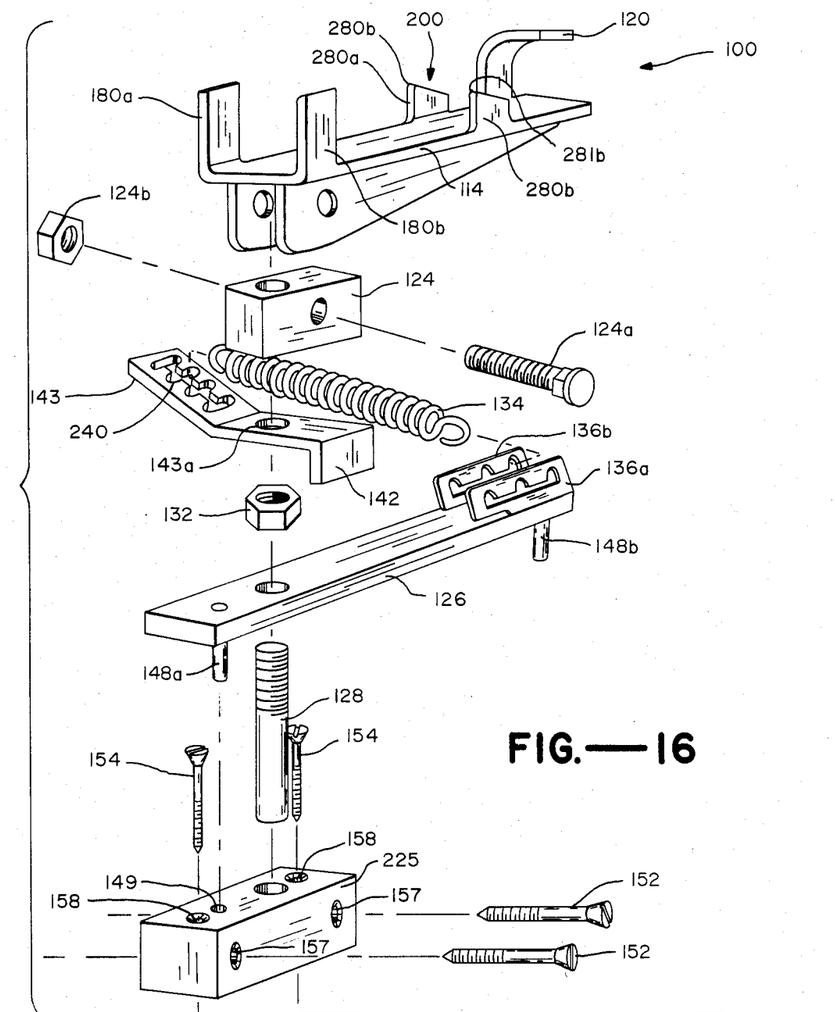
FIG. 16 is a schematic, exploded view of the rod holder of FIG. 12.

Alternate mounting arrangements for the fishing rod holder of the present invention are shown in FIGS. 8 and 9. FIGS. 13 and 16 show yet another mounting arrangement. FIG. 8 shows a top mounting arrangement and FIG. 9 a side mounting arrangement. These two mounting arrangements would be preferably used on boats without an oarlock base. As shown in FIG. 8, the top mounting arrangement includes a mounting base 50 which may be secured by appropriate means, such as screws 52, to a support structure 77. Mounting base 50 has an octagonal opening 54 formed therein which is adapted to receive an octagonal extension 56 secured to arm 26. Pivot pin 28 is positioned within extension 56 and is adapted to rotate with respect thereto. Extension 56 is located in opening 54 of base 50 to mount the fishing rod holder of the present invention.

As shown in FIG. 9, a side mount 58 may also be used to mount the fishing rod holder of the present invention to an appropriate support structure 79. Like mount 50, side mount 58 includes an octagonal opening 60 which is adapted to engage octagonal extension 56 secured to arm 26 wherein pivot pin 28 is positioned within extension 56.

The fishing rod holder 10 of the present invention may also include a means for indicating the speed of the moving boat to which the rod holder is attached. To this purpose, locating pin 48b is provided with a speed gauge pointer 62 (See FIG. 2) which is adapted to register with a speed gauge 64 fixedly secured to bracket 24. The movement of body member 14 would provide an approximate indication of the speed of the boat.

The degree of deflection of a fishing rod positioned in the rod holder of the present invention also provides a relative indication of speed. The rod in effects acts as a long pointer as it rotates in holder 10 (See FIG. 1). As the speed of the boat varies, the force acting on the tip of the rod varies and thus the position of the rod with respect to the side of the boat provides a relative indication of speed. The operator of the boat would therefore be able to duplicate the boat's speed by observing the rod position. This would be beneficial, for instance, if it was desired to troll at a certain speed at which a fish had previously been caught. Speed gauge pointer 62 could be used in the same manner.

The apparatus of the present invention may also be provided with a mechanical alarm system which would indicate a sudden movement of rod 12 positioned in holder 10. As shown in FIG. 2, the alarm system could comprise a rib 66 secured at one end to arm 26 and adapted to engage spring means 34 at the other end. Movement of body member 14 would cause spring 34 to rub against rib 66, creating an audible sound which would alert one to movement of rod 12 indicating the possibility of a strike. As noted, fishing rod holder 10 may be used on either the starboard or port side of a boat. Holder 10 is shown affixed to the port side of boat 46 in FIG. 1. When holder 10 is to be affixed to the starboard side, clasp 20 will be rotated so that its open end faces toward tension arm 26 or in the direction of the stern of the boat (See FIG. 6). The position of limiting member 42 will likewise be adjusted so that rod holder 10 can be located in any operable position on the starboard side of the boat.

The fishing rod holder of the present invention may be used with or without the dampening means. Without the dampening means the rod holder essentially comprises the U-shaped or outboard channel formed by shoulder members 18a and 18b, and the clasp or inboard channel 20 attached to body member 14 which in turn may be fixedly mounted to the gunwale of a boat. In operation, fishing rod 12 is placed in fishing rod holder 10 with reel 16 located between clasp 20 and shoulder members 18a and 18b. The drag of the line in the water exerts a rearward or aft and downward force on the tip of the rod to hold the rod in the rod holder. The rod holder makes use of these same forces to assist in removal of the rod from the holder, thereby permitting quick and easy removal of the rod from the holder. That is, once the rod is inclined about 20 degrees toward the vertical and is free of the outboar channel, it is pulled clear of the holder by the forces acting on the tip of the rod.

Figures 10A, 10B, 10C, 11:
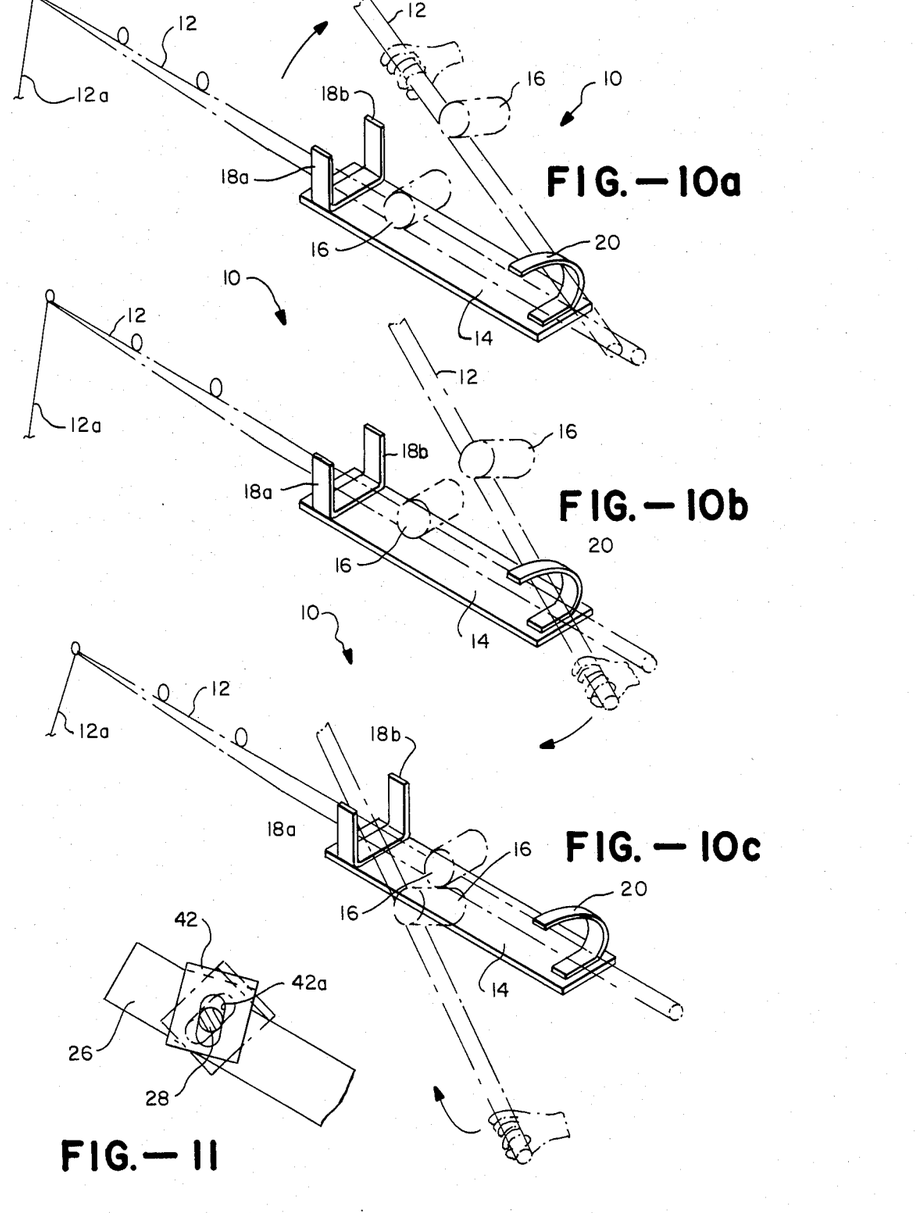
FIGS. 10a-10c schematically illustrate a number of methods of removing a rod from the rod holder of the present invention.
FIG. 11 is a view along a line 11—11 of FIG. 3.
Figure 12:
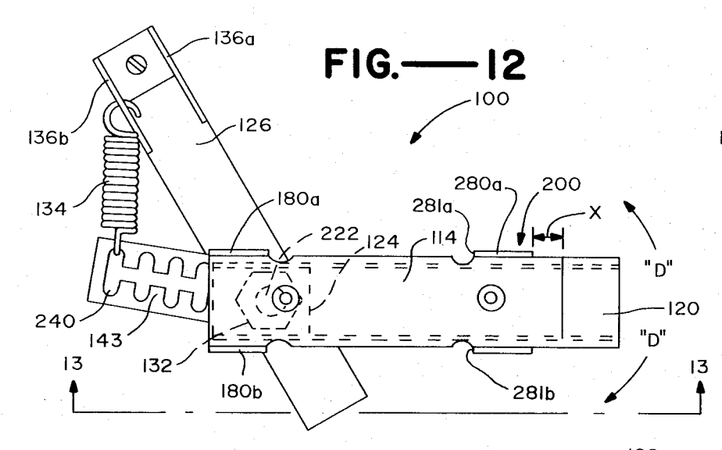
FIG. 12 is a schematic view illustrating an alternate embodiment of the rod holder of the present invention.

The rod holder of the present invention provides for easy, rapid, one-handed release of the rod. When the fisherman desires to remove rod 12 from holder 10 (See FIGS. 10a–10c), he has the following options. First, as shown in FIG. 10a, he can lift the forward portion of the rod (the portion outboard of reel 16) up and out of the outboard channel formed by the shoulder members 18a and 18b. Second, as shown in FIG. 10b, the fisherman can push down on the butt of the rod to lever it free of the holder. This is the most preferred way of removing the rod. Third, as shown in FIG. 10c, he can move the handle portion of the rod sideways out of clasp 20 and then lift the rod free of the rod holder. This last method of removing the rod is generally only necessary when the rod holder is rotated to an extreme aft position as might occur if the limit member came loose.

The dampening means when incorporated into the rod holder absorbs the sudden impact of a fish striking the lure or bait, preventing line and/or rod breakage. The dampening means also acts to maintain tension on the line, and provides a natural action to the lure or bait, as if the rod was held in a fisherman's hand. The dampening means also reduces forces imposed on the rod as the rod supporting portion of the holder rotates in response to forces imposed on the rod tip to thereby facilitate removal of the rod from the rod holder.

Another embodiment of the rod holder of the present invention is illustrated in FIGS. 12–16. Rod holder 100 is similar to the embodiment discussed heretofore.

Rod holder 100 incorporates an intermediate clasp 200, comprising shoulder members 280a and 280b forming a substantially U-shaped channel. The intermediate clasp 200 is located between front shoulder members 180a and 18b of the front channel, and the rear clasp 120. Clasp 200 may be located approximately ½ inch forward of the rear clasp 120. The dimension "x" is thus about ½ inch. The clasp 200 comprises shoulders 280a and 280b that form an intermediate channel.

The channel formed by shoulders 280a and 280b is not as deep as the channel formed by shoulders 180a and 180b. The height "h" of shoulders 280a, 280b and the distance "y" (see FIG. 15) are selected so that the rod and reel 160 may be easily removed from the rod holder by inclining the rod, preferably, about 20 degrees from the vertical. The height "h" of the shoulders should be high enough to maintain the rod in the holder when lateral forces are imposed thereon but low enough such that the angle of extraction is reasonable.

The dimension "r" is the diameter of that portion of the fishing rod that may be positioned within clasp 120. The angle "w" is the angle of extraction of the fishing rod from the rod holder. The dimensions "y" and "z" shown on FIG. 15 illustrate the relationship between the clasp 120 and the intermediate shoulder members 280a, 280b.

The dimension "y" is selected so that it is greater than the diameter "r" of the fishing rod, and the dimension "z" is selected so that it is less than the diameter "r". This permits easy extraction of the rod as well as maintenance of the rod in the holder when, for example, the tip of the rod is depressed by a downward pull exerted on the line. The height "h" is determined by the angle of rod extraction "w". This dimension is preferably about 20 degrees.

If the intermediate shoulder members 280a, 280b were moved toward the outboard shoulders 180a, 180b, the distance "x" would be increased, the distance "z" decreased and the distance "y" increased. The angle of extraction "w" would then be decreased. By adjusting these relationships, it is possible to accommodate most rod diameters with one rod holder configuration, that is, the distance "z" can be less than the diameter of most fishing rods and the distance "y" can be greater than the diameter of most fishing rods.

Intermediate clasp 200 locates and locks the rod in the rod holder at those times there is no drag or force imposed on the line, or at such times as when the fisherman desires to have the rod holder portion of the device inclined upward from the horizontal and gravity tends to have the rod slide downward. Thus, the rod is securely held in place even when the forces of trolling are absent. However, by depressing the inboard end of the rod, the rod may be quickly and easily removed from rod holder 100 (see FIG. 15).

Rod holder 100 further includes a spring limit member 143 that extends forward or outboard of the pivot point 222 about which body member 114 pivots. A pivot pin 128 extends through appropriately formed holes in spring limit 143, tension bar or arm 126, bracket block 124, and mount 225 so that body member 114 is pivotally mounted at one end thereof. A lock nut 132 spaces the spring limit 143 from the tension bar 126. The upper end of pivot pin 128 may be secured in a threaded opening formed in bracket block 124.

Spring limit member 143 is provided with a series of slots 240 to provide multiple attachment points for spring 134 so that the rate of the spring resistance can be varied. The opposite end of spring 134 is attached to tension bar or arm 126. Tension bar 126 may include suitable means, such as slotted brackets 136a and 136b, providing multiple attachment points for the spring. These multiple attachment points allow for varying the spring tension resistance. Alternatively, one slotted bracket, rather than two, may be located on tension arm 126.

The tension bar 126 serves to locate the rod holder relative to the side of a boat, for example, and retains one end of the spring. The tension bar 126 may be fixedly joined to mount 225 which provides a mount for the fishing rod holder. The mount 225 may be, for example, fixedly secured to a gunwale or deck of a boat. To this end, gunwale mounting screws 152 or deck mounting screws 154 are provided. These screws extend through appropriate openings 157 and 158, respectively, for example, in mount 225 to secure the mount to the gunwale or deck. The mount 225 allows the rod holder to be mounted either vertically or horizontally.

The tension bar 126 is adapted to engage the mount 225 to prevent rotation of the rod holder as a whole. Thus, tension bar 126 includes a downwardly projecting stud such as a locating pin 148a. The locating pin 148a engages an opening 149 in mount 225 so that the tension bar 126 is fixedly secured to the mount 225.

Alternatively, two locating pins 148a, 148b may be provided. An alternative mount for the rod holder may comprise an existing oar lock and holes drilled in the top surface of the gunwale of the boat to receive the locatings pins of the tension bar 126.

The configuration of tension bar 126 and spring limit member 143, and the manner in which spring 134 is connected therebetween provides a constant relationship between the spring anchor points regardless of the elevation of body member 114. This configuration also provides a better balance between the force on the rod and the force of the spring, which results in a smoother action.

Spring limit 143 also includes a limit member portion 142, which determines the extent of travel of body member 114 about pivot point 222 along the arc "D—D". Limit member 142 contacts tension bar 126 at the limits of its travel. The opening 143a in spring limit 143 through which pivot pin 128 passes may be alternatively slotted to allow for varying the degree of total travel of spring limit 143.

The elevation of body member 114 may be varied by moving the body member either up or down about the nut and bolt configuration 124a and 124b. Untightening the nut allows this adjustment to be made. The elevation as well as degree of rotation of body member 114 may be adjusted without significantly effecting the tension of spring 134.

As in the previous embodiment, clasp 120 may be rotated 180 degrees to permit use on either the starboard or port side of a boat in a manner as shown in FIG. 5.

The rod holder of the present invention accomplishes the following: holds the rod securely against the forces of trolling; holds the rod securely against the forces of a fish striking the lure or bait; absorbs the force of a fish striking the lure or bait; maintains tension on the line; "plays" the fish until the fisherman can extract the rod from the holder; holds the rod while the boat is motionless; holds the rod if the rod holder is adjusted to an angle of elevation above the horizontal; adjusts for position of the rod relative to the boat, fore and aft, port and starboard, and up and down; adjusts for both tension and rate of shock absorption resistance; reacts to a fish strike automatically as an expert angler might; allows the fisherman to instantly release the rod from the holder with a minimum of manipulation; and provides for use on any sort of boat, and with all types of lines, baits, rods, trolling speeds, fish size, and water conditions.

The rod holder absorbs the destructive violence of the strike and plays the fish with measured resistance until the rod is retrieved from the holder. The result is less fish lost, less broken leaders, less broken hooks, and less broken rods.

The rod holder of the present invention holds the rod at the required angle relative to the boat both vertically and horizontally, the rod holder rotates the rod horizontally to relieve stress when destructive forces act on the tip of the rod such as a strike or grounding. The rod holder automatically keeps tension on the line in response to the actions of a hooked fish. The rod holder locks the rod in place and releases the rod with the movement of one hand. Several rod holders may be tended by one fisherman when trolling or otherwise fishing from the shore or an anchored boat.

When using the rod holder of the present invention for trolling, it is generally desirable to maintain the fishing rod in a near horizontal position and approximately perpendicular to the side of the boat, to keep the line as far away from the propeller of the motor as possible. This is especially important when two rods are being used, one on each side of the boat. This not only keeps the lines clear of the propeller but also prevents fouling of the lines.

As discussed heretofore, the rod holder of the present invention is designed to rotate horizontally to absorb the energy of a fish striking the lure or bait, and to facilitate removal of the rod by lessening the binding of the rod in the holder caused by the pull of the line. It is believed that approximately 60 degrees of rotation is ideal. The initial point of the rod may be approximately 15 degrees forward of the rod's perpendicular position to the side of the boat with the end point of rotation at approximately 45 degrees aft of the rod's perpendicular position to the side of the boat.

At 45 degrees aft, the rod is securely pinned between the upright and top portion of the rear clasp and the aft upright shoulder of the front channel. Should the rod holder be allowed to rotate even further around toward a parallel axis with the boat, the rod is still securely retained. In the case of a trolling reel, the reel is pulled up against the two upright shoulders of the front channel and the top surface of the rear clasp, with a spinning reel, the long extension mount of the reel may be caught by either the intermediate clasp or by the shoulders of the front channel and the handle by the top of the rear clasp.

Figure 17A:
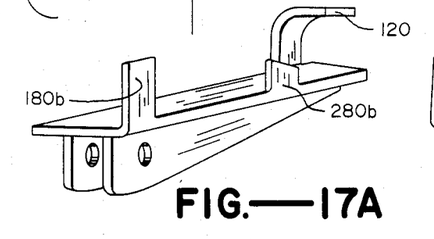
FIGS. 17A and 17B are schematic illustrations of yet other embodiments of the rod holder of present invention.
Figure 17B:
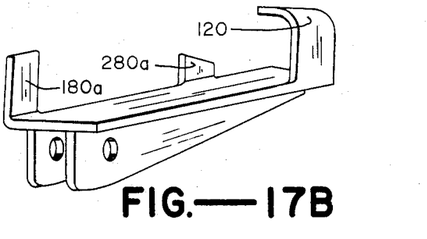

The above-discussed embodiments of the rod holder of the present invention may also be configured to work on only a port or starboard side of a boat, for example. If they were configured for the port side only, the right-side shoulder members of both the front and intermediate channels could be eliminated. This embodiment is shown in FIG. 17A. Similarly, if configured to work on only the starboard side, the left-side shoulder members of the front and intermediate channel members could be eliminated. This configuration is shown in FIG. 17B. In such embodiments, the front and intermediate channels would have two open sides—one parallel and one perpendicular to the top surface of the body member.

Although certain specific embodiments of the invention have been described herein in detail, the invention is not to be limited to only such embodiments, but rather only by the appended claims.

We hereby claim:

1. Apparatus for holding a fishing rod, comprising:
a body member having a top surface for supporting the rod thereon;
a first channel formed at one end of said body member in which a portion of the rod may be positioned, said first channel having one side open and substantially parallel to said top surface of said body member;
a second channel formed at an end of said body member opposite from said first channel, said second channel having an open side substantially perpendicular to said top surface of said body member and adapted to hold a portion of the rod to resist rearward and downward forces imposed on a tip of the rod; and
said second channel comprising a clasp member that is rotatably mounted to said body member so that the open end thereof may be rotated through an angle that permits the apparatus to be utilized on either the port or starboard side of a boat.

2. An apparatus for holding a fishing rod, comprising:
a body member having a top surface for supporting the rod thereon;
at least one shoulder member formed at one end of said body member to define a first channel having an open side substantially parallel to said top surface and adapted to support a portion of the rod therein;
a clasp member mountable to said body member at an end opposite from said shoulder member and defining a second channel having one open side which is substantially perpendicular to said top surface, said clasp member being rotatably mountable to said body member so that the open end thereof may be rotated through an angle that approximates 180 degrees, and said second channel adapted to hold a portion of the rod therein to resist rearward and downward forces imposed on the tip of the rod; and
the rod positionable on said body member to extend between said first and second channels with the butt thereof projecting outwardly from said second channel, a portion of said top surface acting as a fulcrum about which the rod may be levered for removal therefrom.

3. The apparatus of claim 2 further including:
said body member being pivotally mounted at one end thereof and an arm mounted at said one end;
means connectable between said arm and a point spaced from said one end for dampening movement of said body member; and
means for mounting the apparatus to a support structure.

4. The apparatus of claim 2 wherein said clasp member has a substantially U shape.

5. The apparatus of claim 3 wherein the degree of resistance of said connectable means is adjustable.

6. The apparatus of claim 5 wherein said dampening means is a spring.

7. The apparatus of claim 6 further including means for adjusting the spring tension of said spring.

8. The apparatus of claim 3 further including means for limiting the angle of travel of said body member.

9. The apparatus of claim 2 or 3 further including at least one other shoulder member defining a third channel having an open side substantially parallel to said top surface and said third channel formed on said body member between said first channel and said clasp member proximate to said clasp member.

10. The apparatus of claim 9 wherein the height of said third channel is less than that of said first channel.

11. The apparatus of claim 2 further including means for adjusting the angle from the horizontal of said body member.

12. An apparatus for holding a fishing rod comprising:
a body member for supporting the rod thereon;
means for mounting said body member to a boat;
a pair of shoulder members at one end of said body member to define a channel in which a portion of the rod may be positioned; and
a clasp member mountable to said body member at an end opposite from said shoulder members, said clasp member having open and closed sides with the open side thereof adapted to face toward the stern of the boat for holding a portion of the rod near the butt thereof, said clasp member being rotatably mounted to said body member so that the open end thereof may be rotated through an angle of 180 degrees.

13. An apparatus for holding a fishing rod, comprising:
a body member adapted to support said rod thereon, said body member pivotally mounted at one end thereof;
an arm projecting from said pivotally mounted end of said body member;
a clasp member on said body member at an end opposite from said pivotally mounted end for holding a portion of said rod, said clasp member having an open side thereof substantially perpendicular to a top surface of said body member to facilitate removal of said rod therefrom and to resist rearward and downward forces imposed on said rod; and
means connectable between said arm and a point spaced from said pivotally mounted end of said body member for dampening movement of said body member.

14. The apparatus of claim 13 further including a first channel formed at one end of said body member in which a portion of the rod may be positioned, said first channel having one side open and substantially parallel to said top surface of said body member.

15. The apparatus of claim 14 further including a second channel formed on said body member intermediate of said first channel and said clasp member and proximate to said clasp member, said second channel having at least one side open and substantially parallel to said top surface of said body member.

16. The apparatus of claim 15 wherein the height of said second channel is less than that of said first channel.

17. An apparatus for holding a fishing rod, comprising:
a body member adapted to support said rod thereon, said body member pivotally mounted at one end thereof;
an arm mounted at said pivotally mounted end of said body member;
a clasp member mounted to said body member at an end opposite from said pivotally mounted end for holding a portion of said rod, said clasp member having an open side thereof substantially perpendicular to a top surface of said body member to facilitate removal of said rod therefrom and to resist rearward and downward forces imposed on said rod;
means connectable between said arm and a point spaced from said pivotally mounted end of said body member for dampening movement of said body member; and
means for mounting the apparatus to a support structure.

18. The apparatus of claim 17 wherein said clasp member is rotatably mounted to said body member so that the open end thereof may be rotated through an angle of 180 degrees.

19. The apparatus of claim 18 wherein said clasp member has a U shape.

20. The apparatus of claim 17 further including means for adjusting the angle from the horizontal of said body member.

21. The apparatus of claim 20 further including means for limiting the arc of rotation of said body member.

22. A fishing rod holder, comprising:
a body member having a pair of upwardly extending projections formed at one end thereof and adapted to support a portion of said rod therein, said body member pivotally mounted at said one end;
an arm mountable at said one end;
a clasp member mountable to said body member at an end opposite from said one end and adapted to support a portion of said rod therein, said clasp member having open and closed sides with said open side substantially perpendicular to a top surface of said body member;
dampening means connectable between said arm and a point spaced from said one end for dampening movement of said body member about said one end; and
means for mounting the fishing rod holder to a support structure.

23. The fishing rod holder of claim 22 wherein the degree of dampening of said dampening means is adjustable.

24. The fishing rod holder of claim 23 wherein said dampening means is a spring.

25. The fishing rod holder of claim 24 wherein said spring may be mounted at different points along said arm and points spaced from said one end to adjust the degree of dampening thereof.

26. The fishing rod holder of claim 22 wherein said clasp member has a U shape.

27. The fishing rod holder of claim 22 further including means for adjusting the angle from the horizontal of said body member.

28. The fishing rod holder of claim 22 further including means for limiting the arc of rotation of said body member.

29. The fishing rod holder of claim 28 wherein said limiting means is adjustable to permit the apparatus to be mounted on either the port or starboard side of a boat.

30. The fishing rod holder of claim 29 wherein said clasp member is rotatably mounted to said body member so that the open side thereof may be rotated through an angle of 180 degrees to permit the apparatus to be mounted to either the port or starboard side of a boat.

31. The fishing rod holder of claim 22 further including a second pair of upwardly extending projections formed on said body member proximate said clasp member between said clasp member and said first pair of projections, and adapted to support a portion of said rod therein, the height of said second pair of projections being less than that of said first pair of projections.

32. A fishing rod holder, comprising:
a body member having a first pair of upwardly extending projections formed at one end thereof and adapted to support a portion of said rod therein, said body member pivotally mounted at said one end;
an arm mounted at said one end to project thereform;
a clasp member mounted to said body member at an end opposite from said one end and adapted to support a portion of said rod therein, said clasp member having open and closed sides with said open side substantially perpendicular to a top surface of said body member;
spring means connected between said arm and a point spaced from said one end for dampening movement of said body member relative to said one end;
a second pair of upwardly extending projections formed on said body member between said first pair of projections and said clasp member proximate to said clasp member, and adapted to support a portion of said rod therein; and
means for mounting the fishing rod holder to a support structure.

33. The fishing rod holder of claim 32 further including means for adjusting the degree of dampening of said spring means.

34. The fishing rod holder of claim 33 further including means for limiting the angle of travel of said body member.

35. The fishing rod holder of claim 34 wherein said spring means is a helical spring.

36. The fishing rod holder of claim 34 further including means for adjusting the angle from the horizontal of said body member.

37. The fishing rod holder of claim 34 wherein the height of said second pair of projections is less than that of said first pair of projections.

* * * * *